United States Patent
Fredholm et al.

(10) Patent No.: US 8,464,554 B2
(45) Date of Patent: Jun. 18, 2013

(54) METHOD FOR STABILIZING A COLUMN OF MOLTEN MATERIAL

(75) Inventors: Allan M. Fredholm, Vulaines sur Seine (FR); Laurent Joubaud, Paris (FR)

(73) Assignee: Corning Incorporated, Corning, NY (US)

( * ) Notice: Subject to any disclaimer, the term of this patent is extended or adjusted under 35 U.S.C. 154(b) by 24 days.

(21) Appl. No.: 13/031,685

(22) Filed: Feb. 22, 2011

(65) Prior Publication Data

US 2012/0042692 A1 Feb. 23, 2012

(30) Foreign Application Priority Data

Feb. 25, 2010 (EP) .................................. 10305188

(51) Int. Cl.
*C03B 17/04* (2006.01)
(52) U.S. Cl.
CPC ..................................... *C03B 17/04* (2013.01)
USPC .................................................. 65/86; 65/89
(58) Field of Classification Search
CPC ....................................................... C03B 17/04
USPC .............................................. 65/25.1, 86, 89
See application file for complete search history.

(56) References Cited

U.S. PATENT DOCUMENTS

| | | | |
|---|---|---|---|
| 1,218,598 A | 3/1917 | Danner | |
| 1,219,709 A | 3/1917 | Danner | |
| 1,220,201 A | 3/1917 | Danner | |
| 2,009,793 A | 7/1935 | Sanchez-Vello | 49/17.1 |
| 2,462,805 A | 2/1949 | Danner | 49/17.1 |
| 3,190,739 A * | 6/1965 | Wilson | 65/85 |
| 3,212,871 A | 10/1965 | Vatterodt | 65/157 |
| 3,245,770 A * | 4/1966 | Cortright et al. | 65/71 |
| 5,683,482 A | 11/1997 | Fredholm | 65/25.1 |
| 6,062,047 A * | 5/2000 | Fredholm et al. | 65/488 |
| 6,851,280 B2 | 2/2005 | Ott et al. | 65/25.1 |
| 7,059,154 B1 * | 6/2006 | Quentin et al. | 65/99.5 |
| 2001/0055930 A1 | 12/2001 | Ott et al. | 445/9 |
| 2006/0130525 A1 | 6/2006 | Buellesfeld et al. | 65/108 |
| 2007/0271963 A1 | 11/2007 | Lange et al. | 65/439 |

FOREIGN PATENT DOCUMENTS

EP 0 738 689 10/1996

* cited by examiner

*Primary Examiner* — Christina Johnson
*Assistant Examiner* — Cynthia Szewczyk
(74) *Attorney, Agent, or Firm* — Kevin M. Able

(57) ABSTRACT

An apparatus for stabilizing a flow of a viscous material, such as a molten glass or glass ceramic material in a tube or rod forming process is disclosed. The apparatus comprises a stabilization member through which the molten glass is passed after leaving the nozzle of a forming vessel. The stabilization member is positioned a finite distance below the nozzle. The column of viscous material is supported by a wall of the stabilization member, or by a gaseous film disposed between the column and the stabilization member. A method of stabilizing the flow of viscous material after it leaves the nozzle during a drawing process is also disclosed.

14 Claims, 3 Drawing Sheets

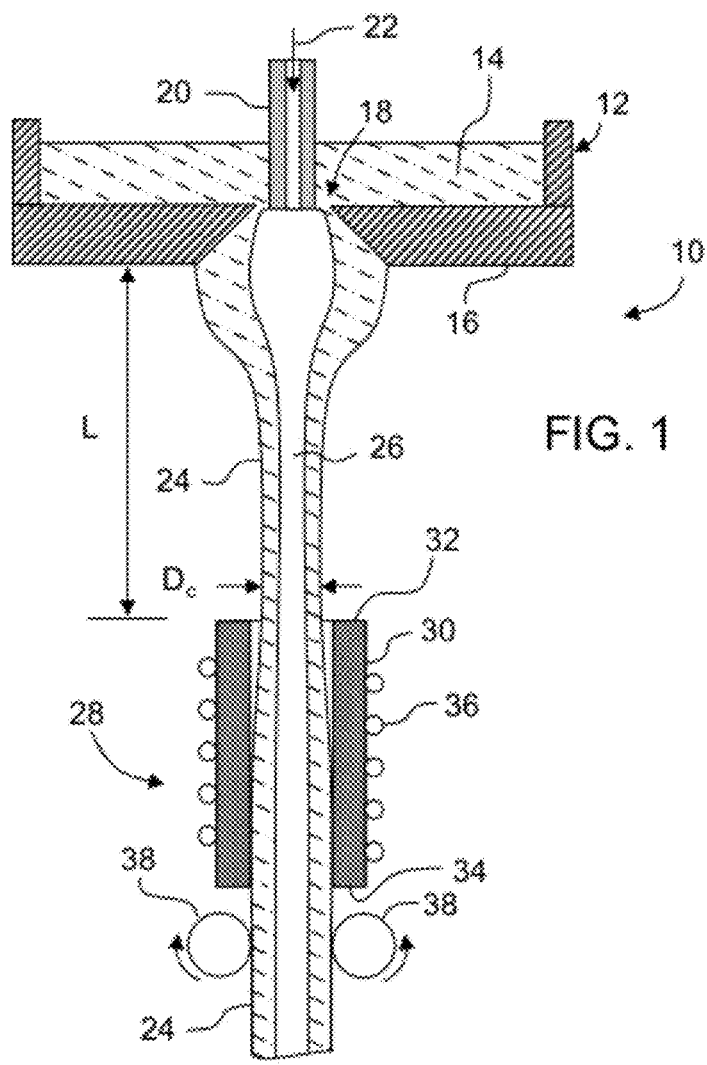
FIG. 1
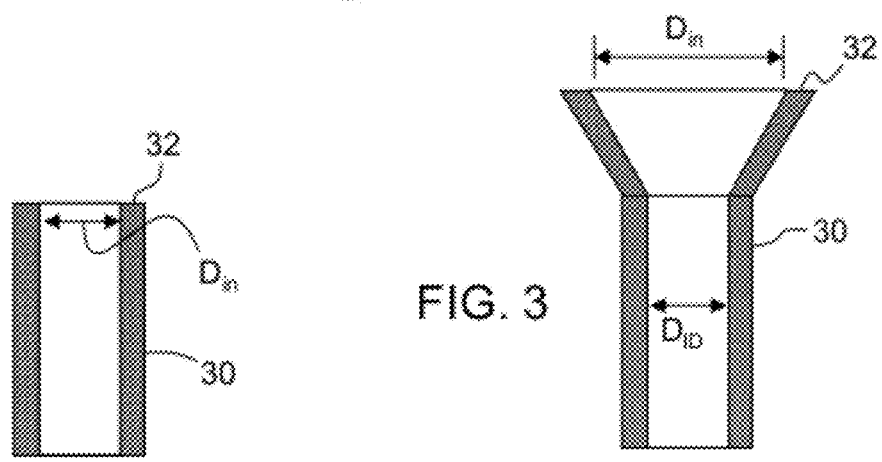
FIG. 2
FIG. 3

METHOD FOR STABILIZING A COLUMN OF MOLTEN MATERIAL

CLAIMING BENEFIT OF PRIOR FILED U.S. APPLICATION

This application claims the benefit of European Application No. 10305188.4, filed on Feb. 25, 2010. The content of this document and the entire disclosure of publications, patents, and patent documents mentioned herein are incorporated by reference.

FIELD

This invention relates to a method and apparatus for making tubes or rods from a molten material, and in particular the formation of glass or glass-ceramic tubes or rods.

BACKGROUND

Methods of manufacturing tubes and/or rods of glass are well known. For example, one method of forming a glass tube or rod is described in U.S. Pat. No. US2009793. In this so-called Vello process, molten glass flows from a vessel through an opening at the bottom of the vessel as a column of molten glass. A blow tube positioned within the flow at the opening injects a gas such as air through a cylindrical or conical section and into the column to create a hollow centerline in the column, thus forming a tube of molten glass having a hollow interior. The direction of flow of the glass tube is thereafter changed from vertical to a non-vertical orientation, such as horizontal. Downdraw variations of this method are also known wherein the glass tube is drawn vertically downward without changing the direction of flow.

Devitrification occurs when a glass transforms into a stable crystalline form. Above a certain temperature, referred to as the devitrification or liquidus temperature, crystallization is inhibited. The liquidus temperature (or conversely the liquidus viscosity) directly influences whether crystallization is likely to occur for a given process.

For a multi-component glass, different devitrification limits often exist in the glass depending on the relevant crystal phase and location of formation. To determine the tendency for a glass to undergo devitrification one must take into account the devitrification limit of relevance to the particular process. In the case of glasses produced by drawing processes, this is generally the crystallization that occurs at the phase boundaries described above.

The tendency of a glass to crystallize can differ considerably from glass to glass, however, and will vary with the chemical composition of the glass. The tendency to crystallize can be influenced by varying the composition. However, variations in composition can significantly impact other properties of a glass, which are often determined by the intended use of the glass. Therefore, it may not be possible to select a glass composition having the requisite stability with respect to crystallization (i.e. not crystallize) and still meet the predetermined physical characteristics dictated by the intended use with conventional methods and equipment.

SUMMARY

Disclosed herein is an apparatus for stabilizing the flow of a viscous liquid material, such as a molten glass material, as the viscous liquid material is drawn from a nozzle as a column of the viscous liquid material. Such processes are useful for forming glass rods or tubes. In some instances, such as when a particular set of attributes are desired, it may be necessary to draw a viscous liquid material at a low viscosity, such as when the viscous liquid has a low liquidus viscosity. To prevent devitrification, the viscous liquid material must be maintained at a high temperature such that the viscosity of the material is less than the liquidus viscosity. However, to provide a stable drawing process where the column of viscous material does not wander or collapse, there are limits on how low the viscosity of the material can be during the drawing process. This leaves the manufacturer in a dilemma; either maintain the viscous material at a sufficiently low viscosity to prevent crystallization and have an unstable process, or maintain the viscosity at a value sufficient for a stable process and risk crystallization. Disclosed herein are methods and apparatuses for stabilizing the flow of viscous material from a nozzle, allowing the manufacturer to draw the material at a viscosity that avoids crystallization.

In one embodiment a method of stabilizing a column of a viscous liquid material is described comprising a) flowing a viscous liquid material from an opening in a vessel to form a column of the viscous liquid material, b) drawing the column of viscous liquid material vertically downward through an atmosphere, c) drawing the column of viscous liquid material into a passage defined by a stabilizing member and including an inlet orifice and an exit orifice, the channel being disposed about the column of viscous liquid material, and d.) wherein a viscosity of the viscous liquid material at the opening is less than a liquidus viscosity of the material and a viscosity of the column at the exit orifice of the stabilizing member is at least $10^{13}$ Poise.

If a tube is desired, such as a tube of glass, a gas may be injected into an interior of the column of viscous liquid material by a blow pipe disposed in an opening of the vessel. If a rod is desired, the flow of gas may be discontinued and/or the blow pipe withdrawn.

In some embodiments, the column of viscous liquid material is flowed through a tube comprising the stabilizing member, and the viscous liquid material contacts an inner wall of the tube.

In other embodiments, the stabilizing tube is formed from a porous material, or a material having a plurality of perforations, and a gas is flowed through the stabilizing tube. The gas forms a film between the column of viscous liquid material and the interior surface of the stabilizing tube that prevents contact between the column of viscous liquid material and the stabilizing tube.

In some embodiments a temperature of the column of viscous liquid material in the stabilizing member can be controlled. For example, cooling elements can be arranged on the stabilizing member, wherein the cooling elements vary the temperature of the column of viscous liquid material as the material flows through the stabilizing member.

An outside diameter of the column of viscous liquid at the inlet orifice is preferably less than an inside diameter of the inlet orifice.

In another embodiment, an apparatus for drawing a molten material into a glass-based tube is disclosed comprising a forming vessel, a blow pipe extending through an opening in the forming vessel to form an annular nozzle through which the molten material is flowed, the blowpipe configured to receive a pressurized gas and inject the pressurized gas into the molten material flowing from the nozzle, and a stabilizing member disposed a predetermined distance below the nozzle and configured to receive the flow of the molten material through a passage in the stabilization member. The passage may be defined by a stabilizing tube comprising a porous or perforated wall. The stabilization member may further comprise a cooling element configured to control a cooling rate of the molten material flowing through the stabilization member. In some embodiments the stabilization member may be configured to receive a pressurized gas that passes through the porous or perforated wall of the stabilizing tube and forms a gas film between the porous or perforated wall of the stabilizing tube and the molten material.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

BRIEF DESCRIPTION OF THE DRAWINGS

FIG. 1 is a cross sectional view of a column of molten glass (e.g. molten glass) flowing from the nozzle of a conventional glass forming apparatus, such as a conventional Vello-type or downdraw process, and including a stabilizing member through which the column is flowed after leaving the nozzle.

FIG. 2 is a cross sectional view of the stabilization member of FIG. 1.

FIG. 3 is a cross sectional view of another stabilization member useable with the apparatus of FIG. 1.

DETAILED DESCRIPTION

Figure 4:
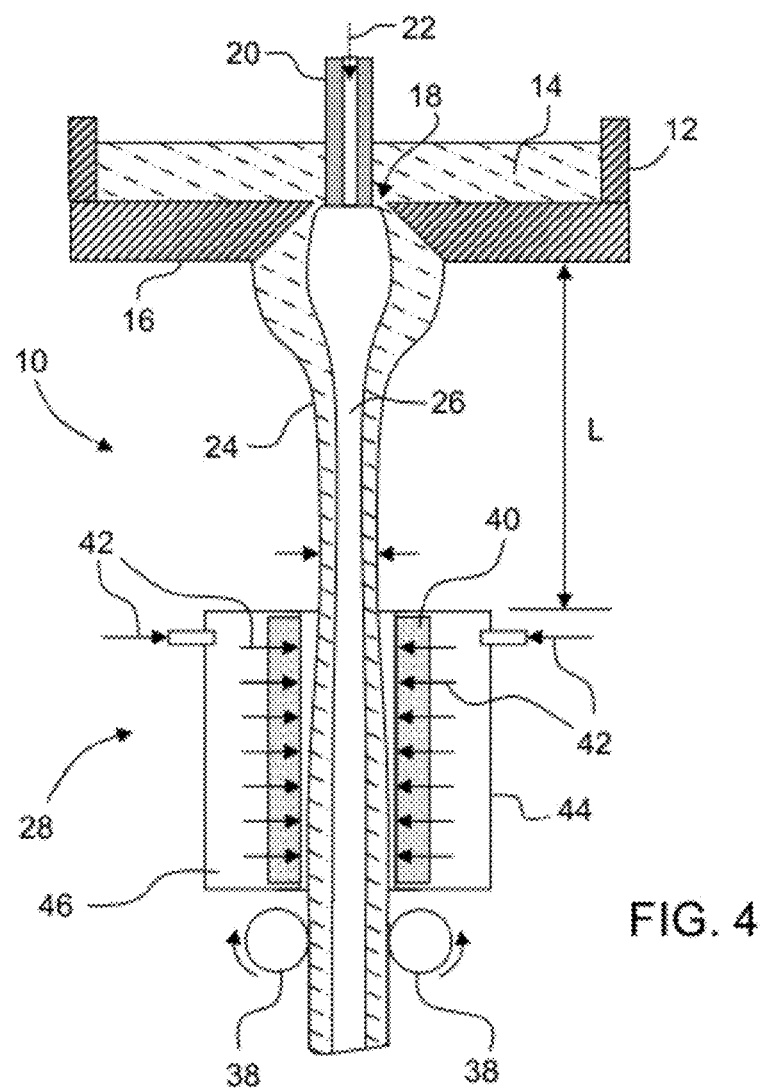
FIG. 4 is a cross sectional view of another apparatus for forming a tube from a molten material comprising another embodiment of a stabilization member.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

As described previously, satisfactory drawing of a glass (or glass ceramic) tube or rod requires a balance between the viscosity of the molten material used to form the article and the ability to draw the article. To wit, the viscosity of the molten material must be low enough to prevent devitrification, particularly where the molten material is in contact with the forming apparatus and the atmosphere, but high enough to prevent flow instabilities in the molten material descending from the forming apparatus. These constraints restrict the number of compositions available for drawing into glass tubes or rods. While the following description will be presented in terms of producing a hollow glass tube, it should be noted that the embodiments described are equally applicable to the drawing of a solid glass rod. As used herein, a tube or rod is construed to mean a body having a circular, oval or elliptical, or polygonal cross sectional shape (i.e. in a plane perpendicular to a longitudinal axis of the body). A tube has a hollow interior whereas a rod is solid throughout. Also, while particular attention is directed to a molten glass material, methods and apparatus disclosed herein may be equally applicable to other processes that form articles from a molten material, such as processes that employ molten plastics.

In a conventional process for forming glass tubes, such as the so-called Vello process, a molten material is supplied to a reservoir having an opening in a lower portion thereof. The opening is typically circular, but may be oval, elliptical or polygonal. A pressurizing member or blow pipe is inserted vertically into the opening generally concentric with the opening, forming an annular nozzle. The blow pipe is adjustable so that it can be raised or lowered vertically relative to the nozzle, and may be straight walled, or have a conical portion where the pressurizing gas exits. The molten material flows through the nozzle while a pressurizing gas, such as air, is blown into the interior of the molten material through the blow pipe to produce a hollow interior in the resultant column of molten material. Drawing or pulling rollers downstream of the nozzle grip the descending tube and apply a downward drawing force. As used herein "downstream" and "upstream" are to be construed relative to the direction of flow of the molten material from the nozzle such that upstream refers to the direction from which the flow comes, and downstream refers to the direction the flow is going. The geometry of the tube can be controlled by varying, for example, the pressure of the gas supplied to the blow pipe, the vertical position of the blow pipe, the draw rate, the viscosity (i.e. temperature) of the molten material, and the mass flow rate of the molten material. In a Vello process, the draw direction of the descending tube is altered from a vertical direction at the nozzle to a lateral or sideways direction (e.g. horizontal) downstream from the nozzle. In other processes, the direction of draw is not altered, but drawn continually downward. Sections of the tube (or rod) having a predetermined length may be separated from the column in either process.

The drawing force on the column of molten material varies as a function of elevation, and will be decreasing from the elevation of the reservoir outlet to the elevation of the first set of pulling rollers. Whenever the vertical draw force applied to a tube of viscous material becomes negative, the flow can become unstable. Hence, if the viscosity of the molten material at the outlet or nozzle of the forming vessel is lower than a certain value, the molten material may flow too freely and the rate of descent due to the weight of the molten column becomes faster than the draw rate. The result is a destabilized flow, making the formation of a straight column of glass difficult or impossible. This viscosity is generally considered to be about 30 kilo Poise (kP). Thus, the manufacturer is ordinarily limited to a particular range of glass compositions that yield both an appropriate working viscosity that allows forming without devitrification and the physical attributes required for the article produced. However, in certain instances attributes of the finished article may be desired that can not be met by glass compositions ordinarily considered drawable. That is, the glass composition needed may have a liquidus temperature that is sufficiently high that the temperature of the material required at the nozzle to prevent devitrification may result in a viscosity at the nozzle below the generally lower limit for successful drawing (e.g. 30 kP). To overcome these flow instabilities and draw molten material at viscosities below about 30 kP, a stabilizing member may be employed as disclosed below.

FIG. 1 illustrates an apparatus 10 for drawing a glass or glass ceramic tube or rod comprising forming vessel 12 containing viscous molten material 14. Apparatus 10 may, for example, comprise a Vello process as described above. Viscous molten material 14 may, for example, be the precursor material for forming a glass or glass ceramic generally referred to as "molten glass" or "melt". As such, molten material 14 is typically formed by melting a mixture of selected metal oxides and other glass forming materials in a melting furnace, and supplying the molten material to the appropriate forming apparatus such as forming apparatus 10. Forming vessel floor 16 helps define opening 18. Blow pipe 20 extends vertically into opening 18 so that the opening is in the shape of a ring or annulus disposed about the blow pipe. The annular opening will hereinafter be referred to as nozzle 18. A gas (e.g. air), indicated by arrow 22, is supplied to blow pipe 20 from a source (not shown) under pressure, and is introduced by the blow pipe into column 24 of molten material flowing vertically downward from nozzle 18. The gas forms and maintains a hollow interior space 26 within column 24. Blow pipe 20 may be adjustable so that a vertical position of the blow pipe may be raised or lowered relative to vessel floor 16. Blow pipe 20 may be straight walled, such as shown in FIGS. 1 and 2, or blow pipe 20 may comprises a conical lower section.

As the column of molten material 24 descends from forming vessel 12 and nozzle 18, the viscous molten material cools and transforms from a viscous material to a visco-elastic material and finally to a solid elastic material (e.g. glass). As the column of viscous molten material descends from nozzle 18, the column also experiences tensile vertical stress, and a diameter of the column narrows. Stabilization member 28 is positioned below forming vessel 12. Stabilization member 28 comprises hollow stabilizing tube 30 including an inlet end 32 and an outlet end 34. Inlet end 32 is positioned proximate the narrowing portion of the column, and has an inlet orifice with a diameter $D_{in}$ (see FIG. 2) larger than diameter $D_c$ of the column of molten material at inlet end 32. The location of inlet end 32 a finite distance L below nozzle 18 depends on the viscosity of the molten material at the forming vessel and the cooling rate below the forming vessel, which can differ with different compositions for the molten material. However, as the column descends from nozzle 18 and passes through hollow stabilizing tube 30, column diameter $D_c$ increases until the column eventually contacts the interior surface of stabilizing tube 30. Stabilization member 28, and particularly the inside surface of stabilizing tube 30 that contacts the viscous molten material, is preferably formed from a metal to which the molten material does not stick, the choice of which is typically temperature dependent. For example, steel may be used where the molten material is at a low temperature (e.g. equal to or less than about 650° C.), graphite may be used where the molten material is at a medium temperatures (e.g. in a temperature range from about 600° C. to about 750° C. or 800° C.), or boron nitride may be used where the molten material is at a high temperature (e.g. at a temperature greater than about 750° C., for example, between about 750° C. and 900° C.) among others.

To control the cooling rate of the molten material as is passes through stabilization member 28 (and stabilizing tube 30) and transitions from a viscous liquid to an elastic solid, a temperature of stabilizing tube 30 may be controlled as a function of draw distance (e.g. distance from nozzle 18) so that the temperature, and viscosity, of the viscous molten material within stabilizing tube 30 is controlled. To that end, stabilization member 28 may include one or more cooling elements. The cooling elements may be disposed proximate an outside surface of stabilizing tube 30 for example. For example, the one or more cooling elements may include piping 36 through which a cooling fluid is flowed. The piping may be wrapped around stabilizing tube 30. In some embodiments, cooling channels may be formed directly within the wall of stabilizing tube 30. Alternatively, thermoelectric cooling elements may be employed. Other conventional cooling methods may be used as appropriate. The cooling fluid may be water, air or any other cooling fluid having suitable heat capacity for cooling the viscous material flowing through the stabilizing tube.

To ensure the descending column of viscous molten material does not contact inlet end 32 of stabilizing tube 30 when entering the stabilizing tube, inlet end 32 of stabilizing tube 30 may comprise a conical shape so that diameter $D_{in}$ of the inlet orifice at inlet end 32 is larger than inside diameter $D_{ID}$ of the stabilizing tube at an intermediate position along the length of the stabilizing tube. Such a configuration is shown in FIG. 3. Once column 24 has exited stabilizing tube 30, the column is pulled downward by counter-rotating pulling rollers 38 positioned below stabilization member 28 that pinch the column and draw the column downward from forming vessel 12. Preferably, the viscosity of column 24 as it leaves stabilizing tube 30 at outlet end 34 is at least about $10^{13}$ Poise.

Figure 5:
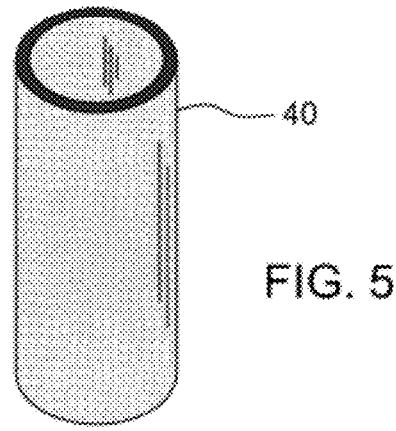
FIG. 5 is a perspective view of a porous tube comprising the stabilization member of FIG. 4.

In another embodiment shown in FIG. 4, column 24 flows through hollow stabilizing tube 40 comprising a porous material, such as graphite. FIG. 5 is a perspective view of porous stabilizing tube 40. The column of viscous molten material 24 descending from nozzle 18 enters the hollow interior portion of stabilizing tube 40 without contacting the inside surface of the stabilizing tube. A pressurized gas, such as air, is supplied to the outside surface of the porous stabilizing tube (represented by arrows 42), and flows through passages in the porous material. The gas is introduced to enclosure or can 44 surrounding porous stabilizing tube 40 so that porous stabilizing tube 40 serves as an interior lining or wall for the can. The pressurized gas fills an interior space 46 within the enclosure and escapes through the pores of the porous stabilizing tube, and thus forms a supporting cushion of gas between the column of molten material 24 flowing through the hollow interior of the porous stabilizing tube and the inside surface of the stabilizing tube. This cushion stabilizes the flow of viscous material to form a straight column. Preferably, the gap between column 24 and the inside surface of stabilizing tube 40 is between about 50 μm and 150 μm. In some embodiments, the gas supplied to enclosure 44 may be temperature controlled so that the cooling rate of the material passing through the hollow interior portion of the stabilizing tube can be controlled. For example, the supplied gas can be cooled by a heat exchanger (not shown). Alternatively, the supplied gas can be heated. Preferably, a viscosity of the material exiting porous stabilizing tube 40 is at least $10^{13}$ Poise.

Figure 6:
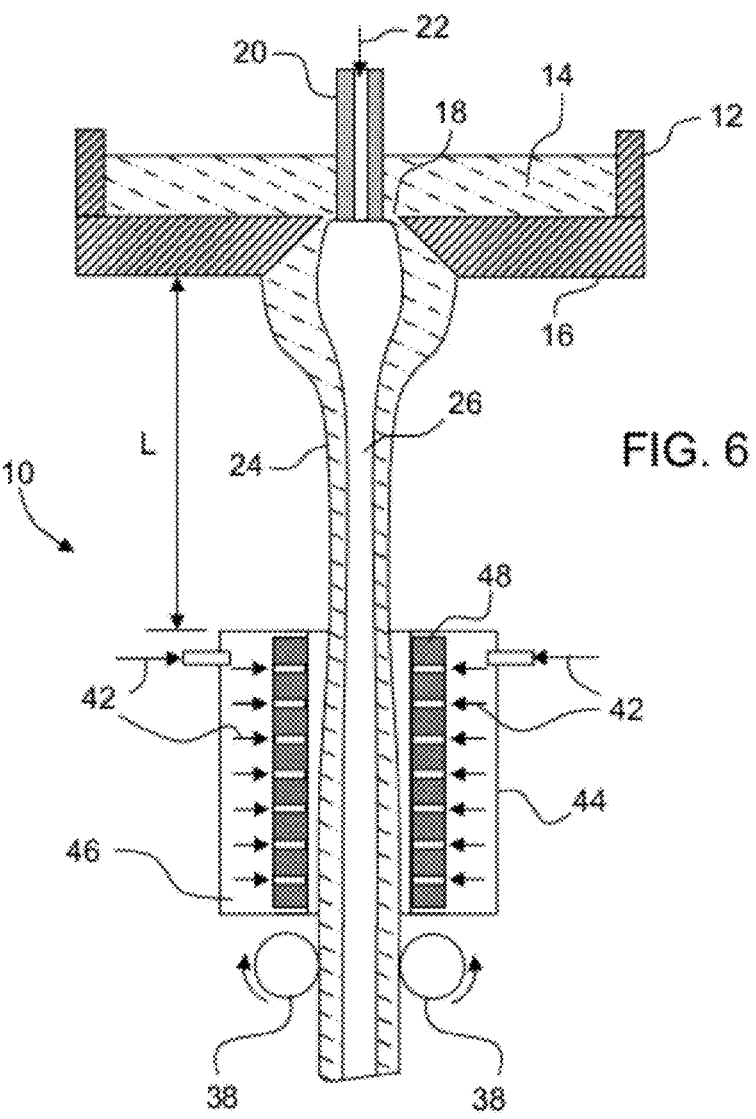
FIG. 6 is a cross sectional view of another apparatus for forming a tube from a molten material comprising another embodiment of a stabilization member.
Figure 7:
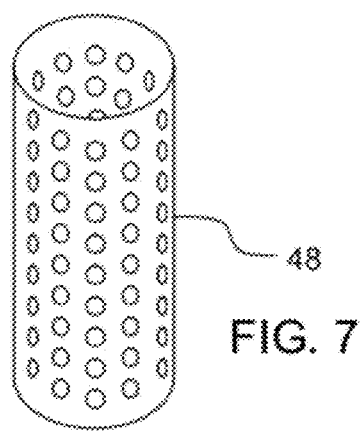
FIG. 7 is a perspective view of a perforated tube comprising the stabilization member of FIG. 6.

In still another embodiment, depicted in FIG. 6, the porous material described in the preceding embodiment is replaced with perforated stabilizing tube 48 (see FIG. 7), i.e. a lining that comprises a large number of holes extending through the wall of the stabilizing tube. As before, stabilization member 28 further comprises enclosure or can 44 surrounding stabilizing tube 48 and forming interior space 46 between the enclosure wall and the stabilizing tube. Pressurized gas (represented by arrows 42) is supplied to the interior space and issues from stabilizing tube 48, forming a cushion of gas between the column of molten material 24 and the perforated stabilizing tube. This embodiment differs from the preceding embodiment in that rather than the gas traversing a myriad of tiny, convoluted passages through the porous material, the gas flows directly through the holes of the perforated wall of the stabilizing tube. The cushion of gas stabilizes the column of viscous material to form a straight column. Preferably, the gap between column 24 and the inside surface of tube 48 is between about 50 µm and 150 µm. In some embodiments, the gas may be temperature controlled so that the cooling rate of the material passing through the hollow interior portion of the stabilizing tube can be controlled. For example, the supplied gas can be cooled by a heat exchanger (not shown). Alternatively, the supplied gas can be heated.

Exemplary, non-limiting embodiments include:

What is claimed is:

1. A method of stabilizing a column of a viscous liquid material comprising:
   a. flowing a viscous liquid material from an opening in a vessel to form a column of the viscous liquid material, wherein the viscous liquid material is a precursor material for forming a glass or glass ceramic;
   b. drawing the column of viscous liquid material vertically downward through an atmosphere;
   c. drawing the column of viscous liquid material into a passage defined by a stabilizing member and including an inlet orifice and an exit orifice, the channel being disposed about the column of viscous liquid material; and
   d. wherein a viscosity of the viscous liquid material at the opening is less than 30 kP and a viscosity of the column at the exit orifice of the stabilizing member is at least $10^{13}$ Poise.

2. The method according to claim 1, further comprising injecting a gas into an interior of the column of viscous liquid material.

3. The method according to claim 1, further comprising contacting the column of viscous liquid material with at least a portion of the stabilizing member.

4. The method according to claim 1, further comprising separating the column of viscous liquid material from the stabilizing member with a gas film.

5. The method according to claim 1, further comprising controlling a temperature of the column of viscous liquid material in the stabilizing member.

6. The method according to claim 1, wherein a diameter of the column of viscous liquid at the inlet orifice is less than a diameter of the inlet orifice.

7. A method of stabilizing a column of viscous material flowing from a nozzle comprising:
   flowing a viscous material from a nozzle to form a column of viscous material, wherein the viscous liquid material is a precursor material for forming a glass or glass ceramic and a viscosity of the viscous molten material exiting the nozzle is less than 30 kP;
   passing the column of viscous material through a hollow stabilization member disposed below the nozzle; and
   wherein a viscosity of the column of viscous material exiting the stabilization member is greater than about $10^{13}$ Poise.

8. The method according to claim 7, further comprising contacting the column of viscous material with at least a portion of an interior of the hollow stabilization member.

9. The method according to claim 7, further comprising separating the column of viscous material from an interior surface of the stabilization member with a gas film.

10. The method according to claim 9, wherein the stabilization member comprises a porous stabilizing tube and the column of viscous material passes through a hollow interior of the stabilizing tube.

11. The method according to claim 7, wherein the stabilization member comprises a cooling element.

12. The method according to claim 11, further comprising flowing a cooling fluid through the cooling element.

13. The method according to claim 7, further comprising injecting a gas into the column of viscous material so that the column of viscous material comprises a hollow interior.

14. The method according to claim 7, wherein the column of viscous material passes through an ambient atmosphere before entering the stabilization member.

* * * * *